US012667504B2

(12) United States Patent
Bazzi

(10) Patent No.: US 12,667,504 B2
(45) Date of Patent: Jun. 30, 2026

(54) PATIENT TRANSPORT APPARATUS WITH A TELESCOPING HANDLE ASSEMBLY

(71) Applicant: Stryker Corporation, Kalamazoo, MI (US)

(72) Inventor: Zahraa Bazzi, Dearborn, MI (US)

(73) Assignee: Stryker Corporation, Portage, MI (US)

( * ) Notice: Subject to any disclaimer, the term of this patent is extended or adjusted under 35 U.S.C. 154(b) by 131 days.

(21) Appl. No.: 18/568,894

(22) PCT Filed: Jun. 27, 2022

(86) PCT No.: PCT/US2022/035058
§ 371 (c)(1),
(2) Date: Dec. 11, 2023

(87) PCT Pub. No.: WO2023/129209
PCT Pub. Date: Jul. 6, 2023

(65) Prior Publication Data

US 2024/0180761 A1 Jun. 6, 2024

Related U.S. Application Data

(60) Provisional application No. 63/294,175, filed on Dec. 28, 2021.

(51) Int. Cl.
*A61G 1/017* (2006.01)
*A61G 1/02* (2006.01)
*A61G 1/048* (2006.01)

(52) U.S. Cl.
CPC ............... *A61G 1/017* (2013.01); *A61G 1/02* (2013.01); *A61G 1/048* (2013.01)

(58) Field of Classification Search
CPC .......... A61G 1/00; A61G 1/003; A61G 1/013; A61G 1/017; A61G 1/02–0293;
(Continued)

(56) References Cited

U.S. PATENT DOCUMENTS 6,648,343 B2 11/2003 Way et al.
7,398,571 B2 7/2008 Souke et al.
(Continued)

FOREIGN PATENT DOCUMENTS

AT 413644 B * 4/2006 ............. A61G 5/061
CN 109091319 A 12/2018
(Continued)

OTHER PUBLICATIONS

AT 413644 B—Translation (Year: 2006).*
(Continued)

*Primary Examiner* — Jacob S. Scott
(74) *Attorney, Agent, or Firm* — Howard & Howard Attorneys PLLC

(57) ABSTRACT

A patient transport apparatus for supporting a patient. The patient transport apparatus includes a seat assembly having a seat frame. A fowler assembly having a fowler frame is coupled to the seat frame and is moveable relative to the seat assembly. The seat and fowler assemblies support the patient. A telescoping handle assembly is coupled to the fowler assembly. A spine of the telescoping handle assembly is moveable relative to a guide of the fowler assembly along an axis to a plurality of spine positions. An upper handle coupled to and moveable with the spine is spaced farther from the seat assembly in an extended position than in a retracted position. A release linkage has a retainer to engage a receiver of the spine to retain the spine. A release interface is engageable to selectively move the retainer out of engagement with the receiver of the spine.

19 Claims, 13 Drawing Sheets

(58) Field of Classification Search
CPC . A61G 1/06; A61G 1/04; A61G 1/048; A61G 5/006; A61G 7/065; A61G 5/061
See application file for complete search history.

(56) References Cited

U.S. PATENT DOCUMENTS

| | | | |
|---|---|---|---|
| 7,950,673 B2 | 5/2011 | Reed et al. | |
| 9,486,373 B2 | 11/2016 | Lambarth et al. | |
| 9,510,981 B2 | 12/2016 | Lambarth et al. | |
| 10,744,049 B2 | 8/2020 | Naber et al. | |
| 10,758,437 B2 | 9/2020 | Lucas et al. | |
| 10,857,047 B2 | 12/2020 | Furman et al. | |
| 11,298,279 B2 | 4/2022 | Trimble et al. | |
| 2003/0132585 A1* | 7/2003 | Way | A61G 5/0883 280/5.22 |
| 2018/0028383 A1 | 2/2018 | Stryker et al. | |
| 2018/0369036 A1 | 12/2018 | Furman et al. | |
| 2020/0179199 A1 | 6/2020 | Feliksa | |

FOREIGN PATENT DOCUMENTS

| | | | | |
|---|---|---|---|---|
| CN | 106943252 B * | 1/2019 | A61G 5/066 |
| DE | 20116074 U1 * | 2/2002 | B66B 9/08 |
| FR | 3032113 A1 * | 8/2016 | A61G 5/061 |
| GB | 2473833 A * | 3/2011 | F16D 49/00 |

OTHER PUBLICATIONS

CN 106943252 B—Translation (Year: 2019).*
DE 20116074 U1—Translation (Year: 2002).*
FR 3032113 A1—Translation (Year: 2016).*
GB 2473833 A—Translation (Year: 2011).*
International Search Report for Application No. PCT/US2022/035058 dated Oct. 10, 2022, 3 pages.
English language abstract and machine-assisted English translation for CN 109091319 A extracted from espacenet.com database on Dec. 11, 2023, 14 pages.

* cited by examiner

PATIENT TRANSPORT APPARATUS WITH A TELESCOPING HANDLE ASSEMBLY

CROSS-REFERENCE TO RELATED APPLICATIONS

The subject patent application claims priority to, and all the benefits of, U.S. Provisional Patent Application No. 63/294,175, filed on Dec. 28, 2021, the entire contents of which are incorporated by reference herein.

BACKGROUND

Patient support systems facilitate care of patients in a health care setting. Patient support systems comprise patient transport apparatuses such as, for example, hospital beds, stretchers, cots, tables, wheelchairs, chairs, stair chairs, and the like. Many conventional patient transport apparatuses, such as for example cots, generally include a base arranged for movement about floor surfaces, and a litter upon which a patient can be positioned or otherwise supported. Here, one or types of lift mechanisms may be employed to facilitate adjusting a vertical position of the litter relative to the base to, among other things, promote patient care, load the patient transport apparatus into an ambulance, and the like.

Conventional stair chairs (or “evacuation chairs”) are configured to facilitate transporting a seated patient up or down a flight of stairs, such as by employing tracks that allow for controlled descent down a staircase. Those having ordinary skill in the art will appreciate that, when used in connection with certain emergency medical services, stair chairs are typically realized as separate patient transport apparatuses from cots. Further, many conventional ambulances are configured to facilitate loading, securing, and transporting cots, but typically only employ storage space for stair chairs. Thus, in scenarios where a patient being transported via an ambulance on a cot must be transported up or down stairs using a stair chair, the patient sometimes has to be transferred between different patient transport apparatuses, such as from a stair chair to a cot which may subsequently be loaded into an ambulance.

It will be appreciated that transporting patients in stair chairs generally necessitates that portions of the stair chair extend, articulate, and the like to facilitate handling by caregivers. By way of example, handles may be provided on various portions of the stair chair to enable caregivers to support and move the stair chair. Certain types of handles may be arranged for telescoping movement after being unlocked, and can be maintained in extended or retracted positions. Adjustment of these types of handles may be difficult to achieve under certain conditions, such as where a caregiver supporting the stair chair wants to extend or retract a handle while also supporting the stair chair at a different location.

A patient support system designed to overcome one or more of the aforementioned challenges is desired.

SUMMARY

The present disclosure provides a patient transport apparatus for supporting a patient. The patient transport apparatus includes: a seat assembly having a front end and a rear end with a seat frame and defining a patient support surface for supporting the patient; a fowler assembly having a fowler frame coupled to a rear end of the seat frame and being moveable relative to the seat assembly, the fowler assembly further defining the patient support surface for supporting the patient, and the fowler assembly including a guide extending along a telescoping axis, and the fowler assembly having a lower handle having a grasping portion spaced from the fowler frame; a telescoping handle assembly coupled to the fowler frame, the telescoping handle assembly including, a spine arranged for movement along the telescoping axis and moveable relative to the guide along the telescoping axis between a plurality of spine positions including an extended position and a retracted position, the spine defining one or more receivers, an upper handle coupled to the spine and moveable with the spine between the extended and retracted positions, the upper handle being spaced farther from the seat assembly in the extended position than in the retracted position; and a release linkage coupled to the lower handle and having a retainer arranged for engagement with the one or more receivers of the spine to retain the spine in one of the plurality of spine positions relative to the guide, and the release linkage including a release interface arranged for user engagement and operably attached to the retainer to selectively move the retainer out of engagement with the receiver in response to user engagement.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1A:
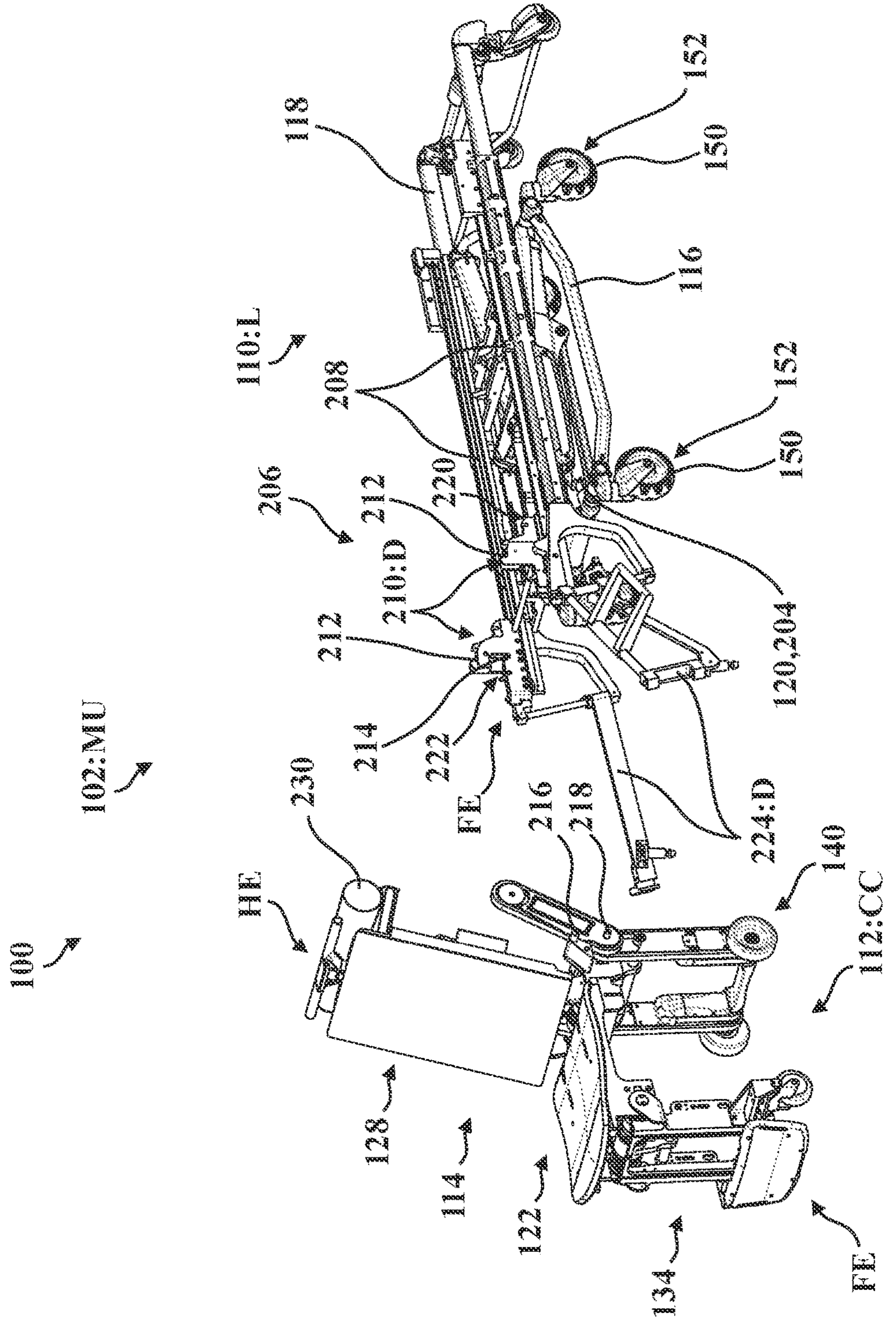
FIG. 1A is a perspective view of a patient transport apparatus of a patient support system of the present disclosure, shown with the patient transport apparatus operating in an undocked mode with a base and supporting a patient treatment device.
Figure 1B:
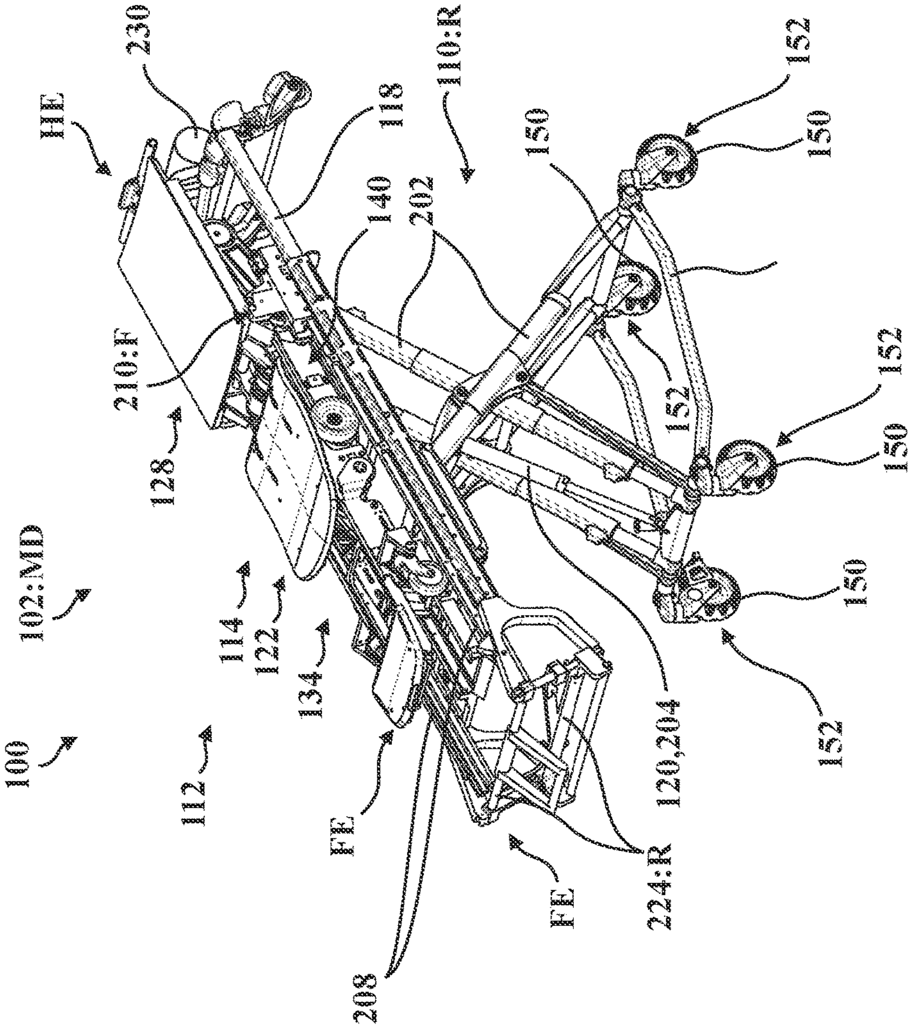
FIG. 1B is another perspective view of the patient transport apparatus of FIG. 1A, shown with the patient transport apparatus operating in a docked mode with the litter secured to the base and supporting the patient treatment device.

Referring to FIGS. 1A-1B, portions of a patient support system 100 are shown including a patient transport apparatus 102 for supporting a patient in a health care setting according to aspects of the present disclosure. In some versions, the patient transport apparatus 102 is configured to be loaded into a cargo area of an ambulance, such as via a power load device (not shown). As will be appreciated from the subsequent description below, while the illustrated versions of the patient transport apparatus 102 described herein are configured as cots for transporting patients, the patient transport apparatus 102 may comprise a hospital bed, a stretcher, a table, a wheelchair, a chair, or a similar apparatus utilized in the care of a patient. The version of the patient transport apparatus 102 shown in FIGS. 1A-1B generally comprises a base 110 and a litter 112. The litter 112 defines or otherwise comprises a patient support surface 114 to support a patient.

In some versions, the patient transport apparatus 102 may comprise a reconfigurable patient support as described in U.S. Pat. No. 9,486,373, which is hereby incorporated by reference in its entirety. In some versions, the patient transport apparatus 102 may comprise a reconfigurable transport apparatus as described in U.S. Pat. No. 9,510,981, which is hereby incorporated by reference in its entirety. In some versions, the patient transport apparatus 102 may comprise a person support apparatus system as described in U.S. Patent Application Publication No. 2018/0028383, which is hereby incorporated by reference in its entirety. In some versions, the patient transport apparatus 102 may comprise a patient transfer apparatus with integrated tracks as described in U.S. patent application Ser. No. 15/854,943, which is hereby incorporated by reference in its entirety. In some versions, the patient transport apparatus 102 may comprise a variable speed patient transfer apparatus as described in U.S. patent application Ser. No. 15/854,199, which is hereby incorporated by reference in its entirety. In some versions, the patient transport apparatus 102 may comprise a patient transfer apparatus as described in U.S. patent application Ser. No. 15/855,161, which is hereby incorporated by reference in its entirety. In some versions, the patient transport apparatus 102 may comprise an ambulance cot as described in U.S. Pat. No. 7,398,571, which is hereby incorporated by reference in its entirety.

With continued reference to FIGS. 1A-1B, the base 110 and litter 112 each have a head end HE and a foot end FE corresponding to designated placement of the patient's head and feet on the patient transport apparatus 102. In FIG. 1A, the litter 112 is shown separated from the base 110; as is described in greater detail below, the base 110 is configured to removably receive and support the litter 112 in certain situations. Put differently, in the illustrated version, the litter 112 is configured for releasable attachment to the base 110. The base 110 generally includes a base frame 116, an intermediate frame 118, and a base lift device 120. The intermediate frame 118 is spaced above the base frame 116 and is moved relative to the base frame 116 via the base lift device 120 as described in greater detail below. Although not illustrated in detail in the drawings, a mattress (or sections thereof) may be disposed on or integral with the litter 112. In such circumstances, the mattress comprises or otherwise defines a secondary patient support surface 114 upon which the patient is supported.

As will be described in greater detail below in connection with FIGS. 2-9, in the illustrated versions, the litter 112 employs a plurality of assemblies, some of which are capable of being articulated relative to others in various ways and under certain operating conditions to adjust the patient support surface 114 and to facilitate docking to and undocking from the base 110. In the illustrated version, the litter 112 generally includes a seat assembly 122 with a seat frame 124 and a seat section 126, a fowler assembly 128 with a fowler frame 130 and a fowler section 132, a front assembly 134 with a front frame 136 and a front section 138, a rear assembly 140 with a rear frame 142, and a ski assembly 144. Each of the assemblies 122, 128, 134, 140, 144 introduced above will be described in greater detail below.

Figure 2:
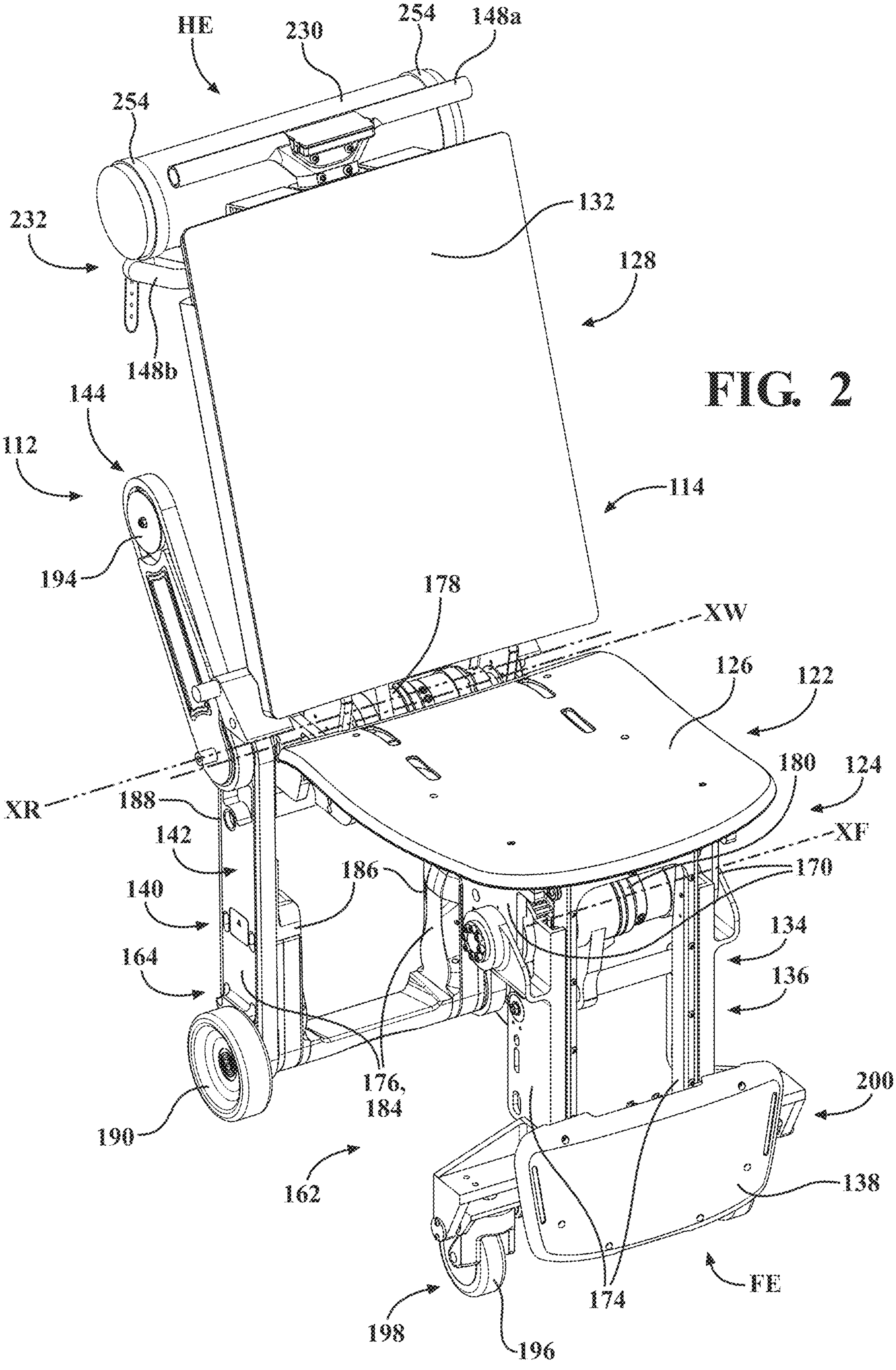
FIG. 2 is a front perspective view of the litter of the patient transport apparatus of FIGS. 1A-1B supporting the patient treatment device.
Figure 3:
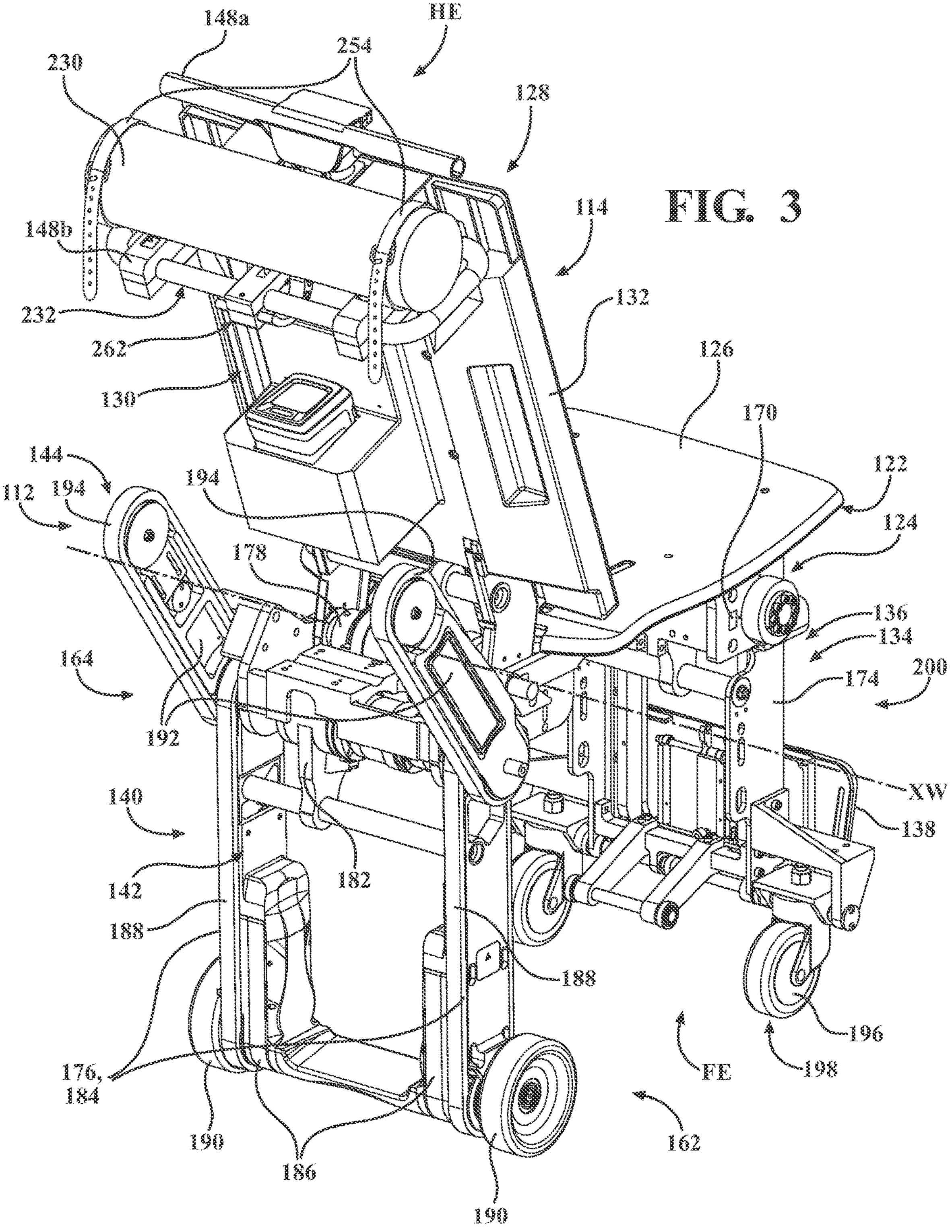
FIG. 3 is a rear perspective view of the litter of the patient transport apparatus of FIGS. 1A-2 supporting the patient treatment device.

In the illustrated versions, the fowler assembly 128 pivots relative to the seat assembly 122 about a fowler axis XW (as best shown in FIG. 2), the front assembly 134 pivots relative to the seat assembly 122 about a front axis XF, and the rear assembly 140 pivots relative to the seat assembly 122 about a rear axis XR. In addition, the ski assembly 144 pivots about the rear axis XR, but could pivot about other axes in some configurations. In the illustrated version, the seat section 126, the fowler section 132, and the front section 138 each provide support to the patient and, thus, generally cooperate to define the patient support surface 114. In the illustrated version, the front section 138 is also configured to translate along the front frame 136, such as is described in U.S. patent application Ser. No. 16/705,878, the disclosure of which is hereby incorporated by reference in its entirety. It will be appreciated that the fowler section 132 and the front section 138 may pivot relative to the seat section 126, or may articulate relative to the seat section 126 in any manner. For instance, the fowler section 132 and/or the front section 138 may both pivot and translate relative to the seat section 126 in some configurations.

Caregiver interfaces 148, such as upper and lower handles 148*a*, 148*b*, help facilitate movement of the patient transport apparatus 102 over floor surfaces. Here, caregiver interfaces 148 may be coupled to the fowler assembly 128, the front assembly 134 (not shown), the intermediate frame 118 (not shown), and the like. Additional caregiver interfaces may be integrated into other components of the patient transport apparatus 102. The upper and lower handles 148*a*, 148*b* and other optional caregiver interfaces 148 are graspable by the caregiver to manipulate the patient transport apparatus 102 for movement.

Base wheels 150 are coupled to the base frame 116 to facilitate transport over floor surfaces, and facilitate supporting the base. The base wheels 150 are arranged in each of four quadrants of the base 110 adjacent to corners of the base frame 116. In the illustrated versions, the base wheels 150 are caster wheels, which are able to rotate and swivel relative to the base frame 116 during transport. Each of the base wheels 150 forms part of a base caster assembly 152. Each base caster assembly 152 is mounted to the base frame 116. It should be understood that various configurations of base caster assemblies 152 are contemplated. In addition, in some configurations, the base wheels 150 are not caster wheels and may be non-steerable, steerable, non-powered, powered, or combinations thereof. Additional base wheels 150 are also contemplated. For example, the patient transport apparatus 102 may comprise four non-powered, non-steerable wheels, along with one or more powered wheels.

In some cases, the patient transport apparatus 102 may not include any wheels. In other configurations, one or more auxiliary wheels (powered or non-powered), which are movable between stowed positions and deployed positions, may be coupled to the base frame 116. In some cases, when these auxiliary wheels are located between caster assemblies and contact the floor surface FS in the deployed position, they cause two of the base caster assemblies 152 to be lifted off the floor surface thereby shortening a wheel base 110 of the patient transport apparatus 102. A fifth wheel may also be arranged substantially in a center of the base 110. Other configurations are contemplated.

It should be noted that in many of the drawings described herein, certain components of the patient transport apparatus 102 have been omitted from view for convenience of description and case of illustration.

A control system (not shown) of the patient transport apparatus may generally comprise one or more powered devices operated by a controller in response to actuation of one or more user interfaces and optionally in response to state signals from a sensing system (not shown). One suitable example of a patient transport apparatus 102 having such a control system is described in U.S. Patent Application Publication No. 2018/0369036, which is hereby incorporated by reference in its entirety.

The litter 112 of the present disclosure is configured to be removably attached to the intermediate frame 118 of the base 110, as noted above and as is described in greater detail below, and is generally operable between: an undocked mode MU (see FIG. 1A) where the litter 112 supports the patient for movement independent of the base 110, and a docked mode MD (sec FIG. 1B) where the litter 112 supports the patient for movement concurrent with the base 110. While operating in the undocked mode MU, the litter 112 is operable between various configurations by pivoting or otherwise articulating assemblies 122, 128, 134, 140, 144 relative to one another. While operating in the docked mode MD, portions of the litter 112 may be articulable to adjust the patient support surface 114, such as by moving the fowler assembly 128.

In some configurations, the litter 112 is configured to serve as a mobile chair to transport the patient along floor surfaces FS as well as up and down stairs ST. Mobile chairs (sometimes called "stair chairs") are used to evacuate patients from buildings where patient accessibility is limited, such as buildings having more than one floor. As noted above, the patient support surface 114 of the litter 112 of the illustrated patient transport apparatus 102 is generally defined by the fowler section 132, the seat section 126, and the front section 138. Here, the seat section 126 is supported by the seat frame 124, and the fowler section 132 is supported by the fowler frame 130 that is coupled to the seat frame 124 such that the fowler frame 130 may pivot or otherwise articulate relative to the seat frame 124. The front section 138 is supported by the front frame 136 which is coupled to the seat frame 124 such that the front frame 136 may pivot or otherwise articulate relative to the seat frame 124. Here too, the rear assembly 140 is coupled to the seat frame 124 such that the rear frame 142 may pivot or otherwise articulate relative to the seat frame 124.

In some configurations, the seat frame 124 may include seat frame members 170 spaced laterally apart from and fixed relative to each other. Similarly, the fowler frame 130 may include fowler frame members 172 spaced laterally apart and fixed relative to each other. The front frame 136 may include front legs 174 spaced laterally apart and fixed relative to each other, and the rear frame 142 may include rear legs 176 spaced laterally apart and fixed relative to each other. In the illustrated version, the litter 112 comprises a fowler actuator 178, a front actuator 180, and a rear actuator 182 which are each driven by the controller (e.g., by a litter controller) and are operatively attached to the seat assembly 122 to facilitate respectively pivoting or otherwise articulating the fowler assembly 128, the front assembly 134, and the rear assembly 140 relative to the seat assembly 122.

In the illustrated versions, the fowler assembly 128 is movable via the fowler actuator 178 between a fowler raised position, a fowler lowered position, and one or more intermediate fowler positions between the fowler raised position and the fowler lowered position.

As noted above, the illustrated patient transport apparatus 102 employs the track driving device 164, which is configured to assist users in traversing a flight of stairs by mitigating the load users (e.g., caregivers) would otherwise be required to lift via caregiver interfaces 148. In some configurations, the track driving device 164 may be configured to move the litter 112 across the floor surface. The track driving device 164 is formed as a part of the rear legs 176 of the rear assembly 140. Here, each rear leg 176 includes a respective track frame member 184 coupled to the seat frame 124 for pivoting movement about the rear axis XR. The track driving device 164 also includes track actuators 186 which drive continuous leg tracks 188 rotatably coupled to the respective leg track frame members 184. The track actuators 186 are coupled to the track frame members 184 and are coupled to (or otherwise disposed in communication with) the controller to drive the leg tracks 188 for ascending and descending stairs. The track driving device 164 may be configured to operate in the same manner or a similar manner as those shown in U.S. Pat. Nos. 7,398,571, 9,486,373, 9,510,981. U.S. 2018/0369036 and/or U.S. Patent Application Publication No. 2018/0028383, previously referenced.

The rear assembly 140 also includes rear wheels 190 rotatably coupled to each of the track frame members 184 that are configured to be disposed in contact with the floor surface FS, such as to support the litter 112 for movement in the chair configuration CC. In the illustrated versions, the rear wheels 190 are freely rotatable. In alternative versions, the rear wheels 190 may be powered drive wheels coupled to the controller. Other configurations are contemplated. The components of the track driving device 164 are arranged such that the leg track frame members 184, the leg tracks 188, and the rear wheels 190 move together with the rear assembly 140 which, as noted above, is arranged to selectively pivot about the rear axis XR to facilitate changing between the various configurations of the litter 112 as well as to facilitate docking and undocking from the base 110.

In some versions, the ski assemblies 144 serve as extensions to the track driving device 164 and likewise help facilitate engagement with stairs ST. To this end, in the illustrated versions, the ski assemblies 144 each include respective ski track frame members 192 operatively attached to the seat frame 124 for pivoting movement about the rear axis XR (or another axis). Here too, the track actuators 186 drive continuous ski tracks 194 rotatably coupled to the respective ski track frame members 192.

The front legs 174 of the front assembly 134 support respective front wheels 196, which are realized as part of respective front caster assemblies 198 arranged to facilitate movement of the litter 112 on the floor surface, as well as to facilitate transitioning between various litter 112 configurations. In the illustrated versions, the front wheels 196 are freely rotatable, but could be motorized, braked, and the like in some versions. As noted above, in some versions, the front section 138 may be translatable along the front frame 136. To this end, the front assembly 134 may include an extension mechanism, generally indicated at 200, configured to longitudinally position the front section 138 relative to the front legs 174. While not depicted in detail herein, the extension mechanism 200 may be similar to as is described in U.S. patent application Ser. No. 16/705,878, the disclosure of which is incorporated by reference in its entirety.

A litter lift device 162 is coupled to the litter 112 and is configured to raise and lower the patient between minimum and maximum heights of the litter 112, and to generally facilitate movement between litter 112 configurations when the litter 112 is separated from the base 110. To this end, the illustrated litter lift device 162 generally includes the front actuator 180 and the rear actuator 182. The base lift device 120 is coupled to the base 110 and is configured to raise and lower the patient between a plurality of vertical configurations including a maximum raised configuration 110R (see FIG. 1B), a maximum lowered configuration 110L (see FIG. 1A), and a plurality of vertical configurations therebetween, both while the litter 112 is supported by the base 110 and, in some versions, while the litter 112 is undocked from the base 110.

In the representative version illustrated in FIGS. 1A-1B, the base 110 comprises one or more lift arms 202 coupling the intermediate frame 118 to the base frame 116. The base lift device 120 comprises one or more base lift actuators 204 coupled to at least one of the base frame 116 and the intermediate frame 118 to raise and lower the intermediate frame 118 and litter 112 relative to the floor surface FS and the base frame 116. The base lift device 120 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

The base 110 of the patient transport apparatus 102 also generally includes a docking subassembly 206 operatively coupled to the intermediate frame 118. Here, the docking subassembly 206 includes intermediate rails 208 which support a trolley 210 for translation between a trolley forward position 210F where the trolley 210 is arranged at the head end HE of the base 110, and a trolley docking position 210D where the trolley 210 is arranged at the foot end FE of the base 110. The trolley 210 includes or otherwise defines upper and lower pin stops 212, 214 which are arranged to engage against respective upper and lower pins 216, 218 of the litter 112 in order to support the litter 112 in a cantilevered position CP during the process of docking the litter 112 to the base 110, as well as to support the litter 112 to the base 110 when operating in the docked mode MD. The docking subassembly 206 also generally includes a forward trolley lock mechanism 220 to inhibit movement of the trolley 210 away from the trolley forward position 210F, and a dock trolley lock mechanism 222 to inhibit movement of the trolley 210 away from the trolley docking position 210D, in order to facilitate transitioning between the undocked mode MU and the docked mode MD.

As noted above, evacuation of the patient is often accomplished outside the confines of a patient care facility. In these circumstances, caregivers may need to bring patient treatment devices 230 necessary to facilitate evacuation with them inside the building and keep the patient treatment devices close to the patient during evacuation. The patient treatment device 230 is realized as an Oxygen tank in this disclosure. However, it is contemplated that other patient treatment devices 230 may be employed. Requiring a caregiver to carry the patient treatment device 230 while simultaneously operating the litter 112 to evacuate the patient from the building can be cumbersome. To case this burden, the patient treatment apparatus 102 may include a support frame assembly 232 to secure the patient treatment device 230 to the litter 112.

As shown in FIGS. 3-6, the support frame assembly 232 may be coupled to the fowler frame 130. The support frame assembly 232 may include a handle (lower handle **148*b*). As noted above, the illustrated versions of the litter 112 may include the upper handle 148*a* and the lower handle 148*b* as caregiver interfaces. In this version, the handle of the support frame assembly 232 comprises the lower handle 148*b*. It is contemplated that the support frame assembly 232 may include another handle or a different handle. The lower handle 148*b* may extend from the fowler frame 130. The lower handle 148*b* may have a grasping portion 234 spaced from the fowler frame 130** designed for the caregiver to grasp.

Figure 4:
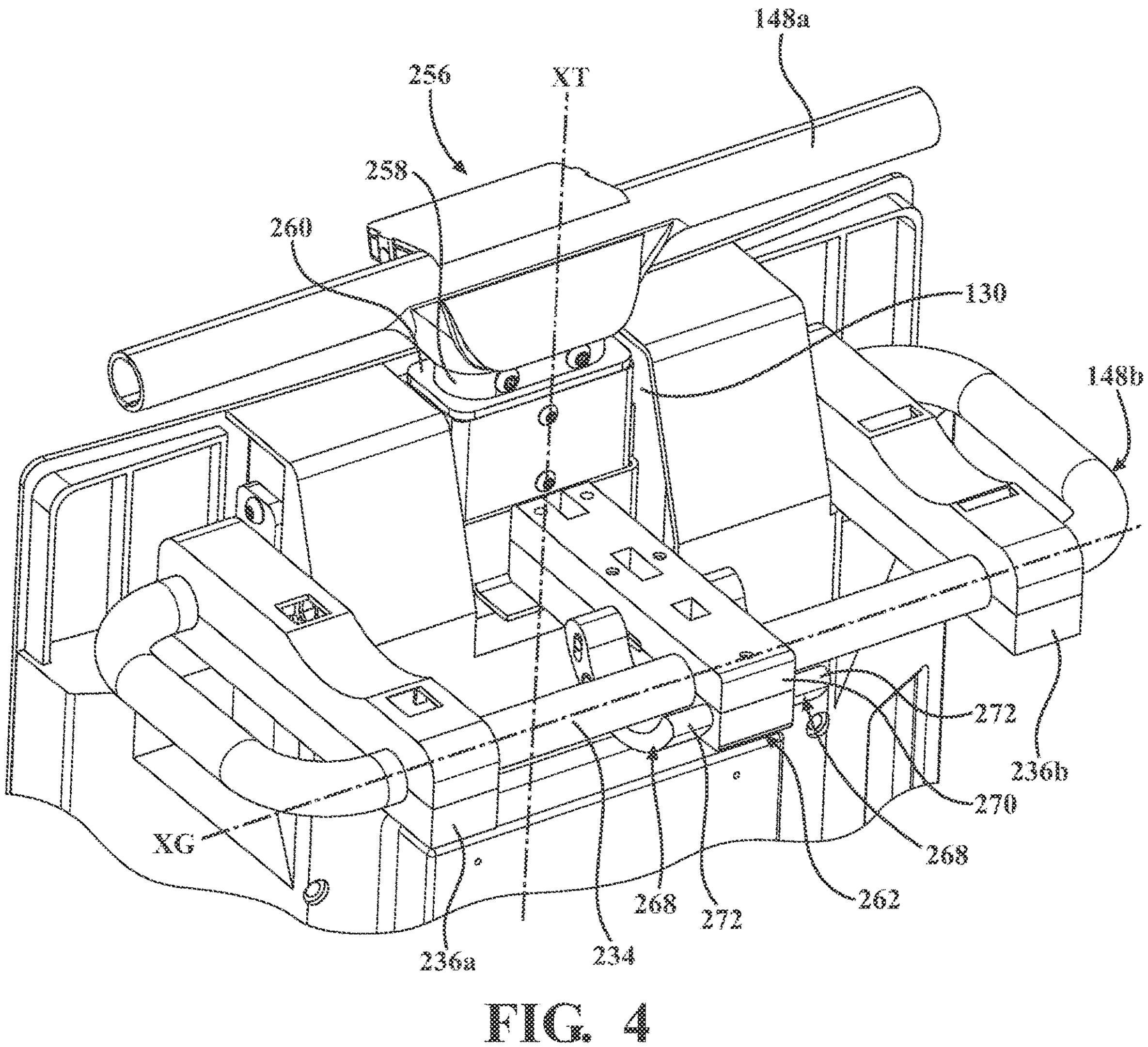
FIG. 4 is a partial rear perspective view of a support frame assembly of the litter of the patient transport apparatus of FIGS. 1A-3.
Figure 5:
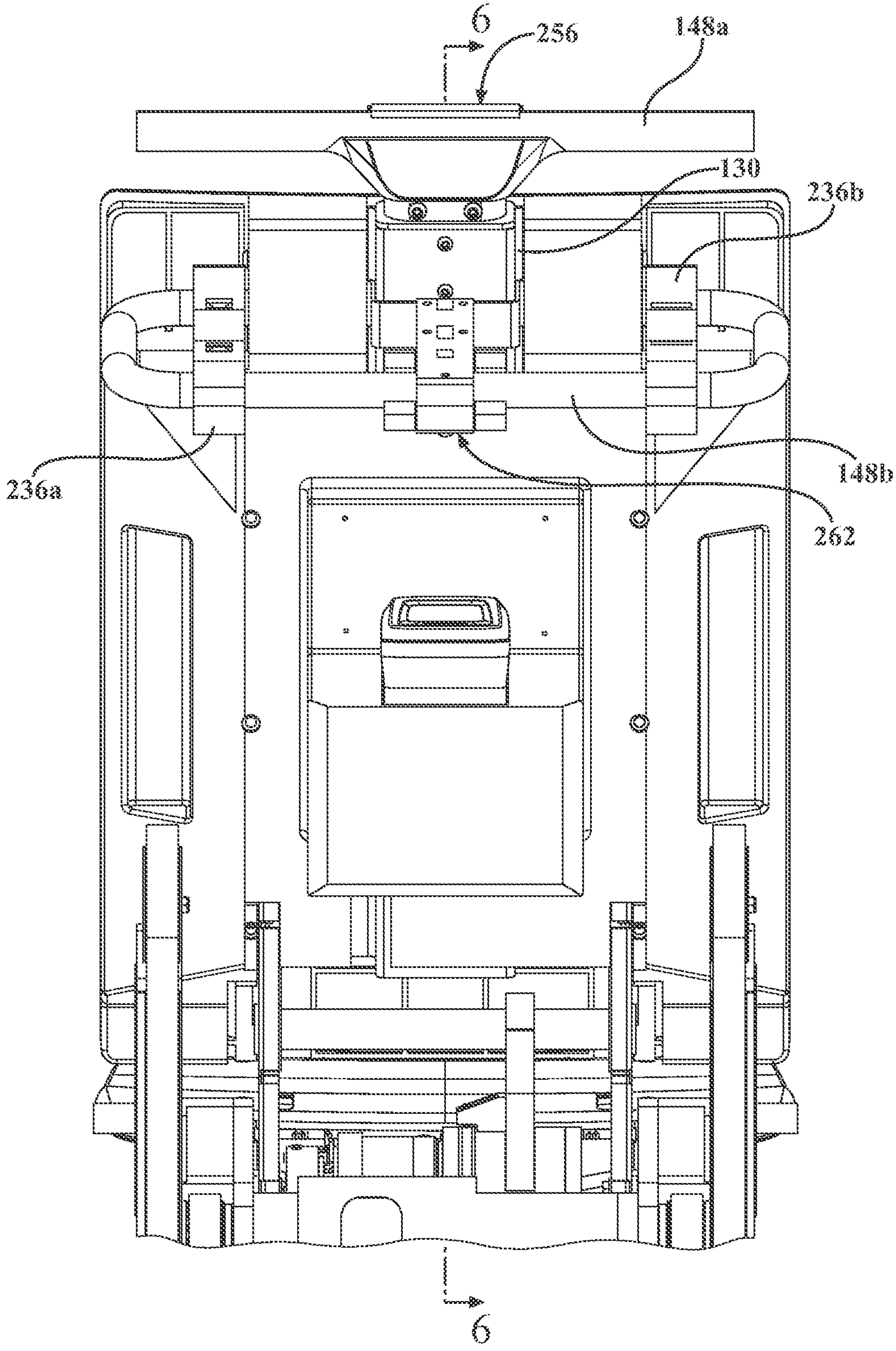
FIG. 5 is a rear elevation view of the support frame assembly and a fowler assembly of the litter of the patient transport apparatus of FIGS. 1A-4.

The support frame assembly 232 may also include first and second mounting members **236*a*, 236*b* coupled to the lower handle 148*b* adjacent the grasping portion 234 of the lower handle 148*b*. The mounting members 236*a*, 236*b* may extend toward the fowler assembly 128. The mounting members 236*a*, 236*b* may define a brace surface 238 shaped for supporting the patient treatment device (e.g., the oxygen tank). The brace surface 238 is spaced from the grasping portion 234 of the lower handle 148*b* for permitting the caregiver to grab the grasping portion 234 while supporting the patient treatment device (FIG. 4). One or more straps 254 attached to the mounting members 236*a*, 236*b* or the lower handle 148*b* may be employed for securing the patient treatment device 230 to the mounting member 236*a***.

The grasping portion 234 of the lower handle **148*b* may extend along a grasping axis XG. The grasping axis XG may be parallel to the fowler axis XW. The mounting members 236*a*, 236*b* may extend perpendicularly relative to the grasping axis XG such that the patient treatment device 230 may be disposed across the mounting members 236*a*, 236*b*, parallel to the grasping portion 234**.

As noted above, caregivers may use the litter 112 to evacuate patients from buildings where patient accessibility is limited, such as buildings having more than one floor. In these circumstances, caregivers may need to operate the litter 112 on stairs to move the patient between floors. While the caregiver and patient are ascending or descending stairs, it may be advantageous to the caregiver to provide easy adjustment of a position or orientation of caregiver interfaces 148, such as the upper handle **148*a*, to maintain proper grip and allow for better caregiver posture. To facilitate a change in position of the upper handle 148*a*, the patient transport apparatus 102 includes a telescoping handle assembly 256**.

Figure 11:
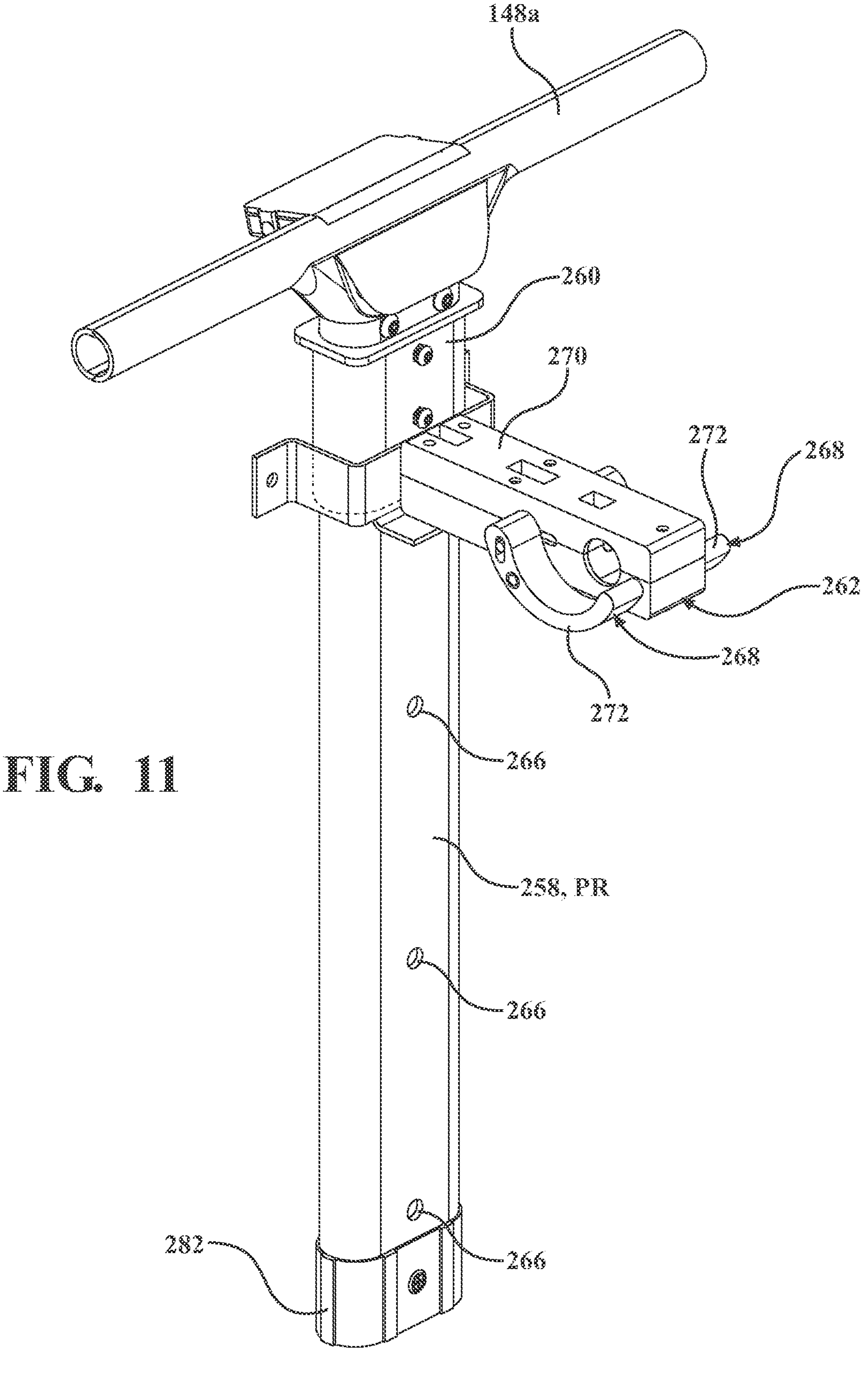
FIG. 11 is a partial perspective view of the telescoping handle assembly of the litter of the patient transport apparatus of FIGS. 1A-10 with a spine in a first position.
Figure 12:
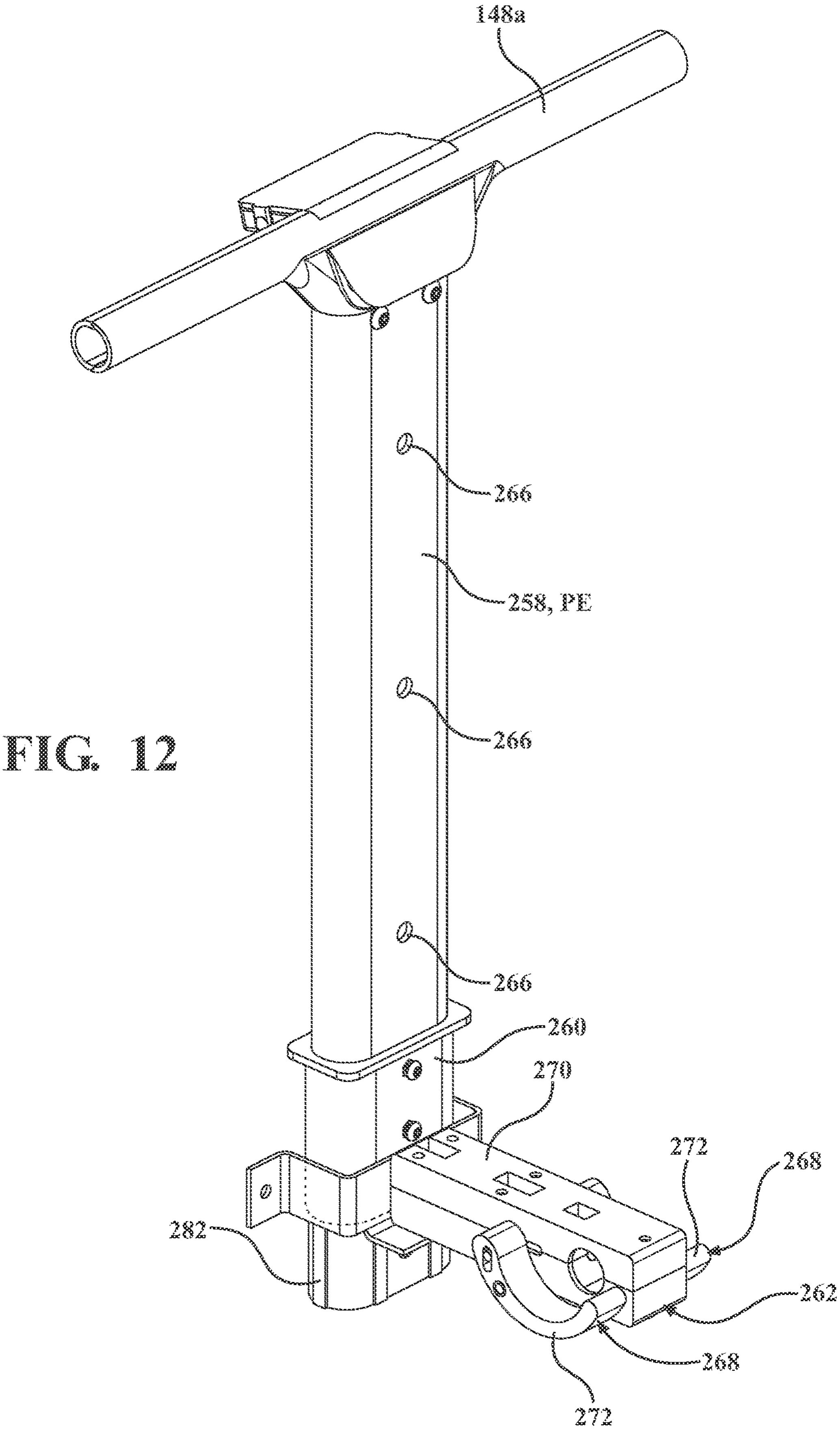
FIG. 12 is a partial perspective view of the telescoping handle assembly of the litter of the patient transport apparatus of FIGS. 1A-11 with the spine in a second position.

The telescoping handle assembly 256 is coupled to the fowler frame 130. The telescoping handle assembly 256 includes a spine 258 arranged for movement along a telescoping axis XT. The fowler assembly 128 includes a guide 260 coupled to the fowler frame 130 and extending along the telescoping axis XT. The spine 258 is moveable relative to the guide 260 along the telescoping axis XT between a plurality of spine positions including an extended position PE (see FIG. 12) and a retracted position PR (see FIG. 11). The telescoping handle assembly 256 further includes the upper handle **148*a* coupled to the spine 258 and moveable with the spine 258 between the extended and retracted positions. The upper handle 148*a* is spaced farther from the seat assembly 122 in the extended position PE than in the retracted position PR. The seat assembly 122 may be closer to the lower handle 148***b* than the upper handle 148*a* when the upper handle 148*a* is in the retracted position PR.

The telescoping handle assembly 256 also includes a release linkage 262 coupled to the lower handle 148*b*. The release linkage 262 has a retainer 264 arranged for engagement with one or more receivers 266 defined in the spine 258 to retain the spine 258 in one of the plurality of spine positions relative to the guide 260. The release linkage 262 includes a release interface 268 arranged for user engagement and operably attached to the retainer 264 to selectively move the retainer 264 out of engagement with the receiver 266 in response to user engagement.

Figure 6:
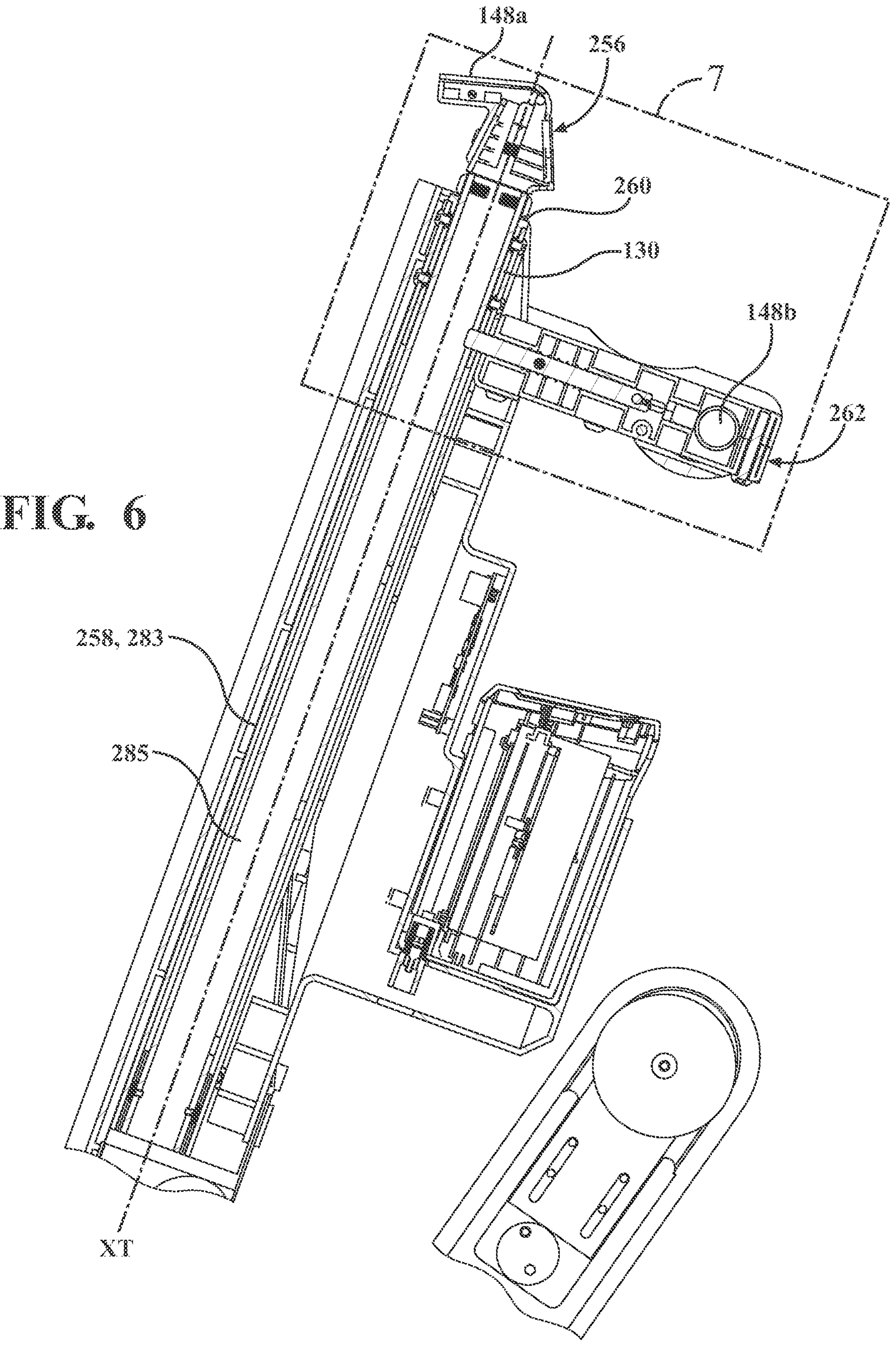
FIG. 6 is a partial section view of the support frame assembly and the fowler assembly of the litter of the patient transport apparatus of FIGS. 1A-5.
Figure 7:
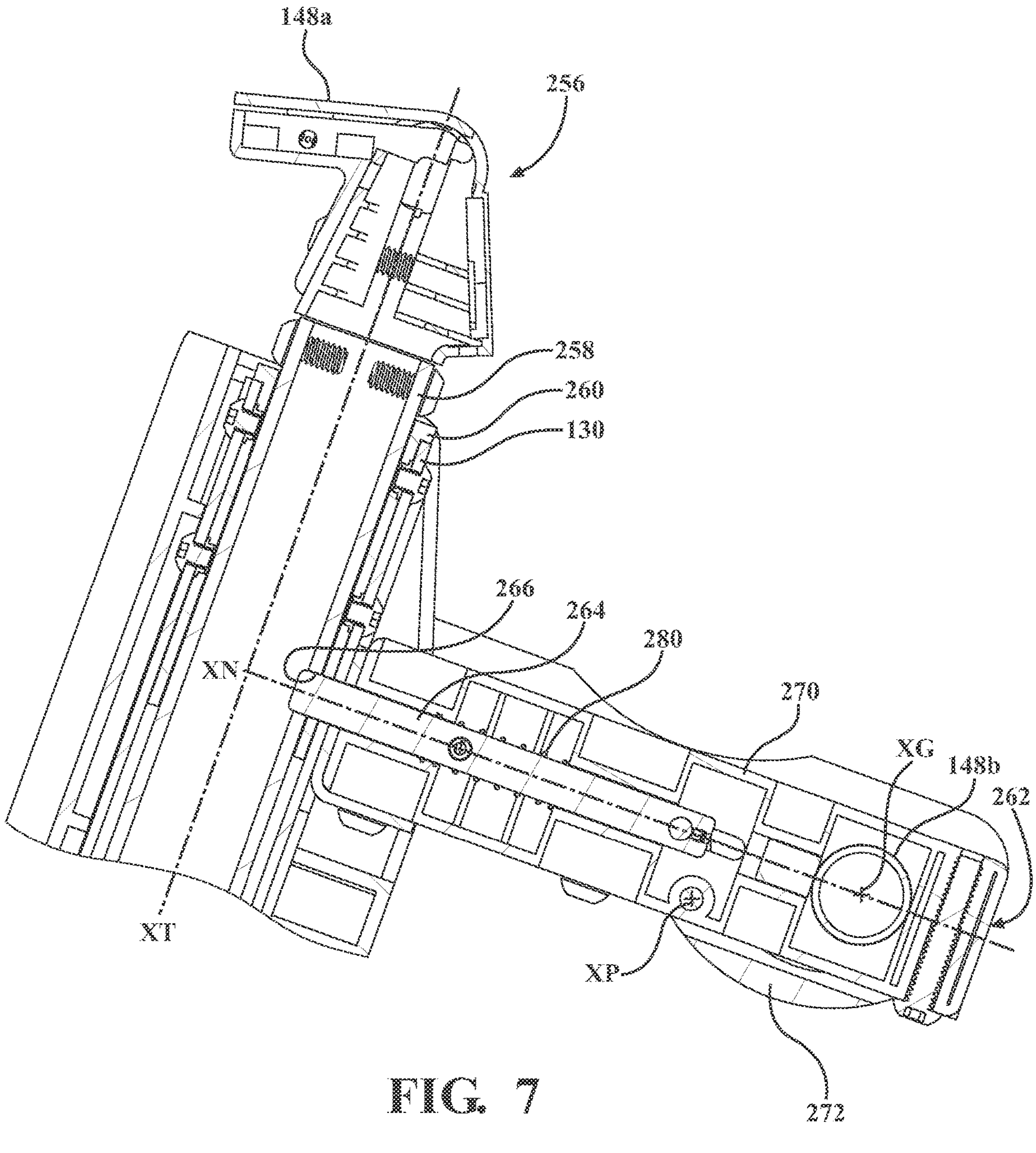
FIG. 7 is a detailed section view of a portion of FIG. 6.
Figure 8:
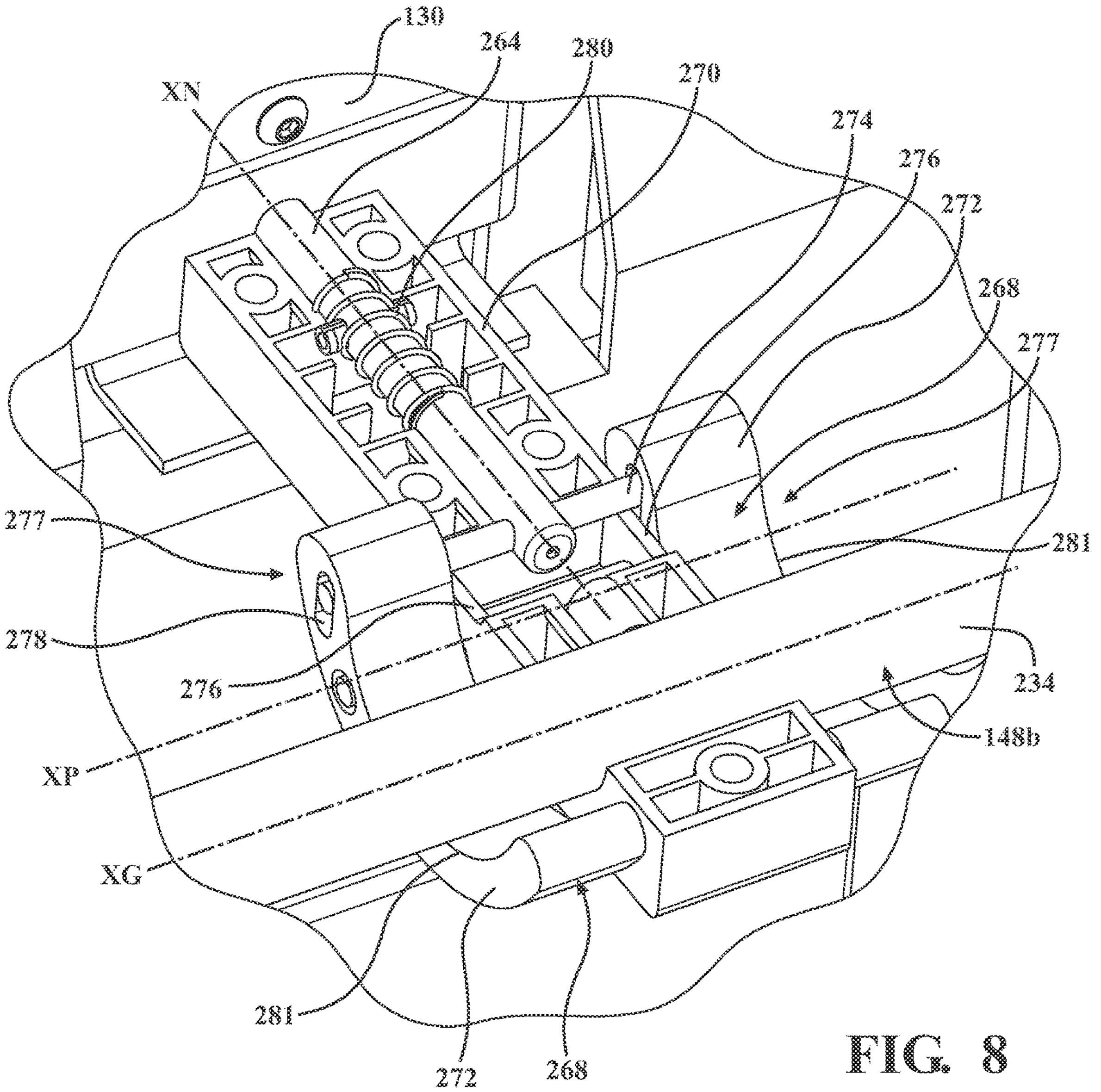
FIG. 8 is a partial perspective view of a portion of a release linkage of a telescoping handle assembly of the litter of the patient transport apparatus of FIGS. 1A-7.
Figure 9:
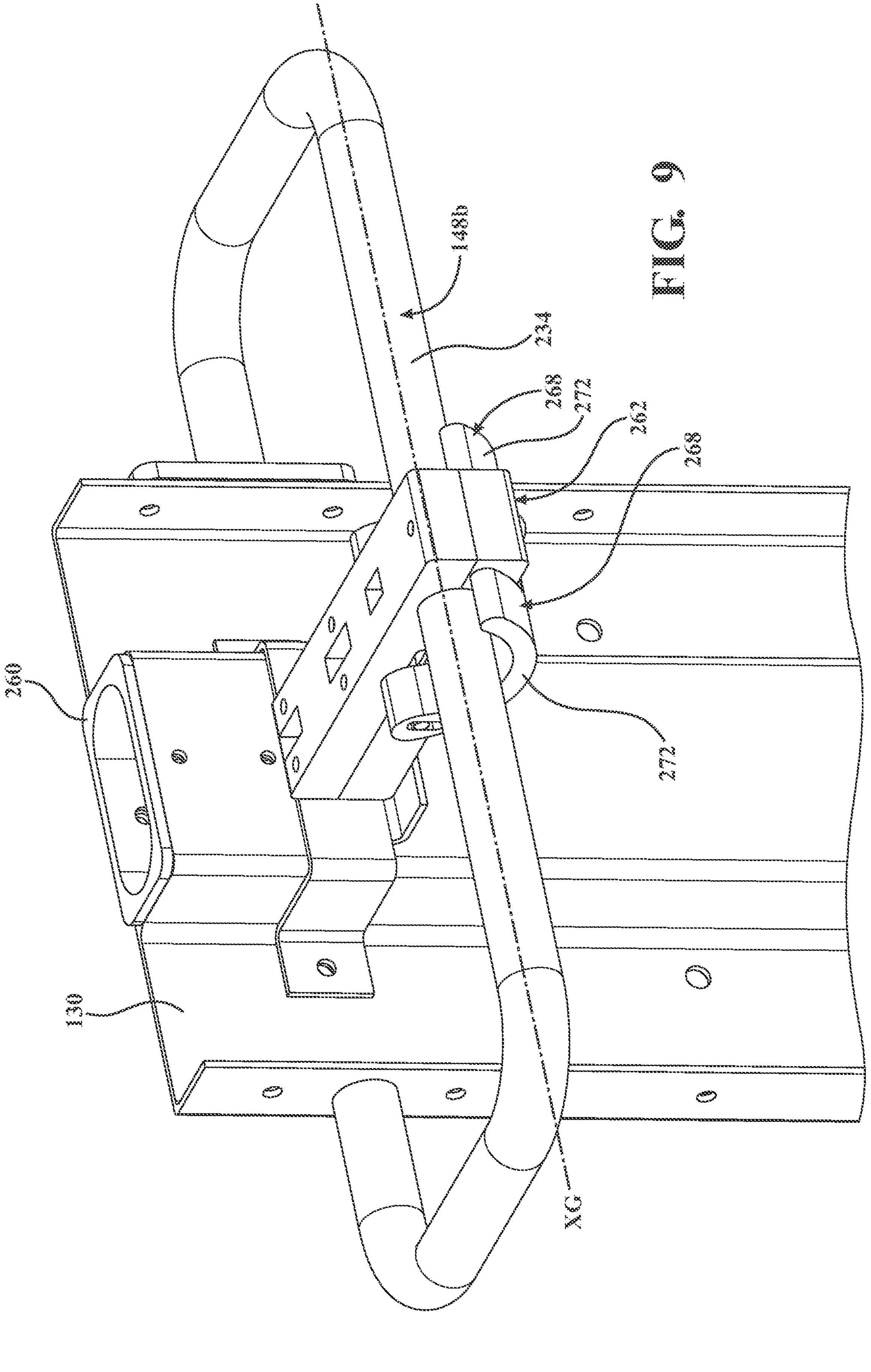
FIG. 9 is a partial perspective view of the release linkage and a portion of the fowler assembly of the litter of the patient transport apparatus of FIGS. 1A-8.
Figure 10:
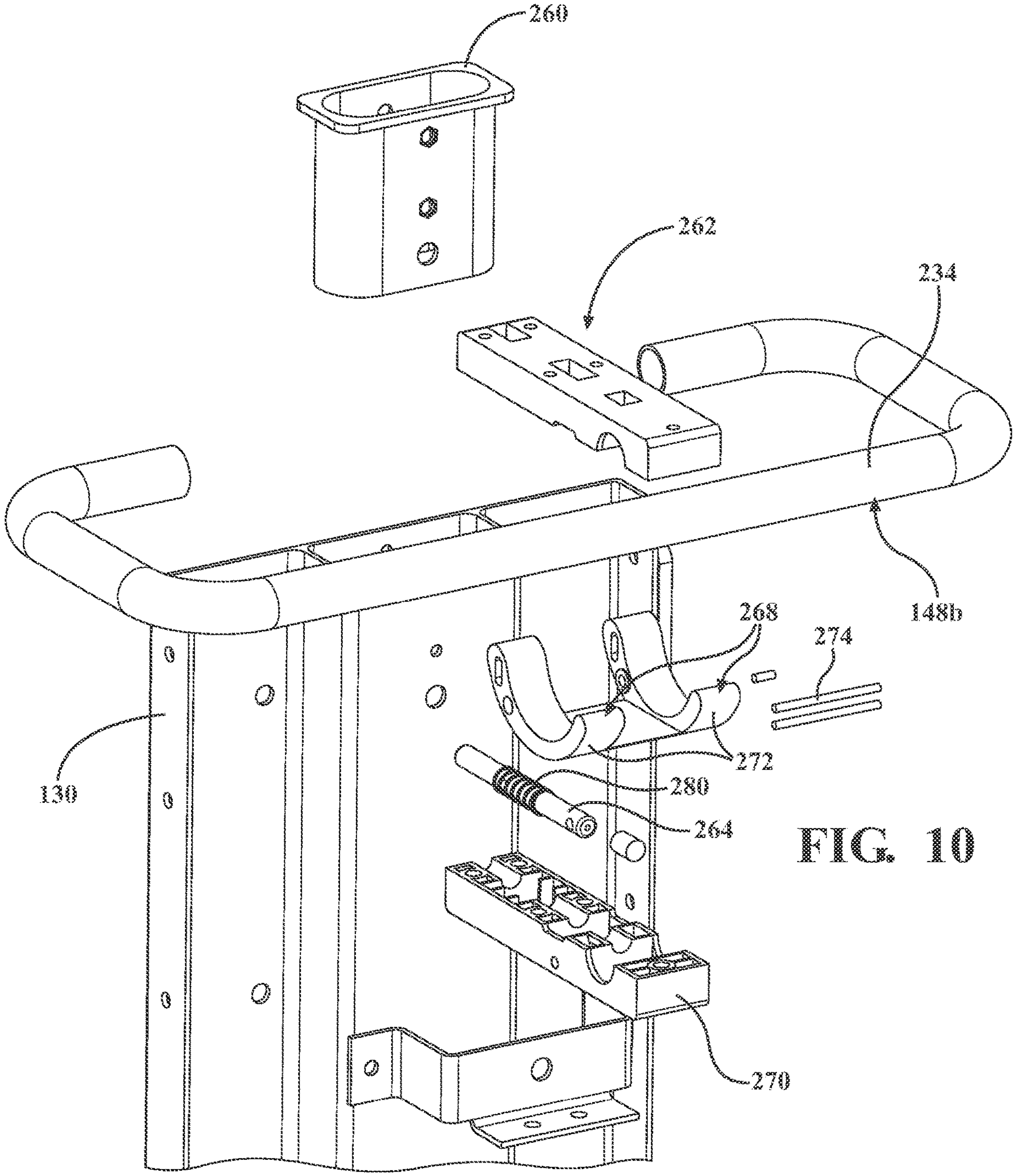
FIG. 10 is a partial perspective view of the release linkage and a portion of the fowler assembly of the litter of the patient transport apparatus of FIG. 9 exploded.

As shown in FIGS. 6-8, the retainer 244 may have a generally elongated profile and may be moveable along a retainer axis XN to engage one or more receivers 266. FIG. 8 illustrates the release linkage 262 with a portion of a release linkage housing 270 removed for illustrative purposes. The guide 260 at least partially surrounds the spine 258. In some versions, the retainer 264 may extend through the guide 260 to engage the one or more receivers 266. In some versions, the guide 260 may be arranged differently and may not be disposed between the retainer 264 and the spine 258. Other configurations are contemplated.

The release interface 268 may include a pivot member 272 that is pivotable about a pivot axis XP perpendicular to the retainer axis XN. The pivot member 272 may be pivotably coupled to the release linkage housing 270. The release linkage 262 may include a cross-pin 274 coupled to the retainer 264 and the pivot member 272. The release linkage housing 270 may define a housing slot 276 extending parallel to the retainer axis XN for receiving the cross-pin 274. The pivot member 272 may define a pivot slot 278 for receiving the cross-pin 274. The pivot member 272, the cross-pin 274, and the retainer 264 may collectively form or otherwise define a slotted link mechanism 277 (sometimes referred to as a scotch yoke mechanism) to convert rotational movement of the pivot member 272 into linear movement of the retainer 264. More specifically, the housing slot 276 and the pivot slot 278 provide necessary degrees of freedom to the cross-pin 274 to permit rotational movement of the pivot member 272 to translate into linear movement of the retainer 264. A biasing member 280 may be coupled to the release linkage 262 to urge the retainer 264 into engagement with the spine 258 and/or receivers 266. It is contemplated that other release linkages or release mechanisms could be employed to retain the spine 258 in the one or more of the plurality of spine positions PE, PR.

The pivot member 272 may be positioned adjacent the grasping portion 234 of the lower handle 148*b* to permit a user to simultaneously engage the pivot member 272 while grabbing the grasping portion 234 of the lower handle 148*b*. This configuration allows the caregiver to keep one hand on the lower handle 148*b* while adjusting the height of the upper handle 148*a* as desired with the other hand. The pivot member 272 may comprise a curved body 281 to at least partially surround the grasping portion 234 of the lower handle 148*b*. The pivot member 272 may be disposed beneath the grasping portion 234 of the lower handle 148*b*. The illustrated version of the pivot member 272 partially surrounding the lower handle 148*b* beneath the lower handle 148*b* supports the caregiver being able to wrap their fingers around the grasping portion 234 of the lower handle 148*b* while engaging the pivot member 272 with their thumb. In addition to facilitating simple, single-handed operation from different positions, it will be appreciated that this configuration also gives the caregiver greater visibility to the release interface 268 when objects (e.g., the patient treatment device 230) are disposed between the lower handle 148*b* and the fowler frame 130.

The spine 258 may comprise an elongated tube 283 having a hollow interior and extending along the telescoping axis XT. The spine 258 may employ an elongated tube 283 with a non-circular cross-section, such as with a rounded rectangular profile, which is slidably disposed in or otherwise supported for movement along a correspondingly-shaped slide bearing 285. Here, it will be appreciated that a rounded rectangular profile affords rigidity to the spine 258 from a single, central location. In some versions, the spine 258 may comprise a solid body. The one or more receivers 266 may comprise a notch or an aperture formed in the spine 258. In other words, the one or more receivers 266 may extend through a wall of the spine 258 or the one or more receivers 266 may not extend through the wall of the spine 258.

In some configurations, a spine stop 282 may be coupled the spine 258, such as at the end of the spine 258 opposite the upper handle 148*a*, to limit movement of the spine 258 relative to the guide 260. In some configurations, the spine stop 282 abuts the guide 260 to limit movement of the spine 258 relative to the guide 260. In other configurations, the spine stop 282 abuts another portion of the litter 112, e.g., the fowler frame 130, to limit movement of the spine 258 relative to the guide 260. In some configurations, the spine stop 282 abuts the guide 260 when the spine 258 is in the extended position (see FIG. 12).

It will be further appreciated that the terms "include." "includes," and "including" have the same meaning as the terms "comprise," "comprises," and "comprising." Moreover, it will be appreciated that terms such as "first," "second." "third." and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus for supporting a patient, the patient transport apparatus comprising:

- a seat assembly having a front end and a rear end with a seat frame and defining a patient support surface for supporting the patient;
- a fowler assembly having a fowler frame coupled to a rear end of the seat frame and being moveable relative to the seat assembly, the fowler assembly further defining the patient support surface for supporting the patient, and the fowler assembly including a guide extending along a telescoping axis, and the fowler assembly having a lower handle having a grasping portion spaced from the fowler frame;

a telescoping handle assembly coupled to the fowler frame, the telescoping handle assembly including, a spine arranged for movement along the telescoping axis and moveable relative to the guide along the telescoping axis between a plurality of spine positions including an extended position and a retracted position, the spine defining one or more receivers, an upper handle coupled to the spine and moveable with the spine between the extended and retracted positions, the upper handle being spaced farther from the seat assembly in the extended position than in the retracted position; and a release linkage coupled to the lower handle and having a retainer arranged for engagement with the one or more receivers of the spine to retain the spine in one of the plurality of spine positions relative to the guide, and the release linkage including a release interface arranged for user engagement and operably attached to the retainer to selectively move the retainer out of engagement with the receiver in response to user engagement.

II. The patient transport apparatus of clause I, wherein the seat assembly is closer to the lower handle than the upper handle in the retracted position.

III. The patient transport apparatus of any of clauses I-II, wherein the receiver comprises one receiver selected from a notch and an aperture formed in the spine.

IV. The patient transport apparatus of any of clauses I-III, wherein the retainer extends through the guide to engage the receiver.

V. The patient transport apparatus of any of clauses I-IV, wherein the retainer is moveable along a retainer axis to engage the receiver.

VI. The patient transport apparatus of clause V, wherein the release interface comprises a pivot member pivotable about a pivot axis perpendicular to the retainer axis.

VII. The patient transport apparatus of clause VI, wherein the release linkage comprises a cross-pin coupled to the retainer and the pivot member.

VIII. The patient transport apparatus of clause VII, wherein the pivot member defines a slot for receiving the cross-pin; and wherein the pivot member, the cross-pin, and the retainer define a slotted link mechanism to convert rotational movement of the pivot member into linear movement of the retainer.

IX. The patient transport apparatus of any of clauses VI-VIII, wherein the retainer comprises an elongated body.

X. The patient transport apparatus of any of clauses VI-IX, wherein the pivot member is positioned adjacent the grasping portion to permit a user to simultaneously engage the pivot member while grasping the grasping portion of the lower handle.

XI. The patient transport apparatus of any of clauses VI-X, wherein the pivot member comprises a curved body to at least partially surround the grasping portion of the lower handle.

XII. The patient transport apparatus of any of clauses VI-XI, wherein the pivot member is disposed beneath the grasping portion of the lower handle.

XIII. The patient transport apparatus of any of clauses I-XII, wherein the spine comprises an elongated tube extending along the telescoping axis.

XIV. The patient transport apparatus of clause XIII, wherein the elongated tube comprises a non-circular cross-section.

XV. The patient transport apparatus of any of clauses I-XIV, wherein the fowler frame is rotatable relative to the seat frame about a fowler axis, and wherein the grasping portion of the lower handle extends along a grasping axis parallel to the fowler axis.

XVI. The patient transport apparatus of any of clauses I-XV, further comprising:

a front assembly coupled to the front end of the seat frame and configured for movement between a plurality of front assembly positions; and a rear assembly coupled to the rear end of the seat frame and configured for movement between a plurality of rear assembly positions.

XVII. The patient transport apparatus of clause XVI, further comprising:

a front actuator arranged to articulate the front assembly relative to the seat frame between the front assembly positions; and a rear actuator arranged to articulate the rear assembly relative to the seat frame between the rear assembly positions.

XVIII. The patient transport apparatus of any of clauses I-XVII, wherein at least part of one or more of the seat assembly, the fowler assembly, and the telescoping handle assembly defines a portion of a litter.

XIX. The patient transport apparatus of clause XVIII, further comprising:

a base having a head end and a foot end, the base including:

a base frame supporting a plurality of wheels arranged for movement about a floor surface, an intermediate frame having a trolley configured to translate between a plurality of trolley positions including a trolley forward position where the trolley is arranged at the head end of the base and a trolley docking position where the trolley is arranged at the foot end of the base, and a base lift device to move the intermediate frame relative to the base frame between a plurality of vertical configurations including a maximum raised configuration and a maximum lowered configuration, wherein the litter is configured to be docked to and undocked from the trolley of the intermediate frame such that, when docked to the trolley, the litter is configured to slidably translate relative to the intermediate frame between a plurality of litter positions to facilitate docking and undocking the litter from the trolley.

What is claimed is:

1. A patient transport apparatus for supporting a patient, the patient transport apparatus comprising:

a seat assembly having a front end and a rear end with a seat frame and defining a patient support surface for supporting the patient;

a fowler assembly having a fowler frame coupled to a rear end of the seat frame and being moveable relative to the seat assembly, the fowler assembly further defining the patient support surface for supporting the patient, and the fowler assembly including a guide extending along a telescoping axis, and the fowler assembly having a lower handle having a grasping portion spaced from the fowler frame;

a telescoping handle assembly coupled to the fowler frame, the telescoping handle assembly including, a spine arranged for movement along the telescoping axis and moveable relative to the guide along the telescoping axis between a plurality of spine positions including an extended position and a retracted position, the spine defining one or more receivers, an upper handle coupled to the spine and moveable with the spine between the extended and retracted positions, the upper handle being spaced farther from the seat assembly in the extended position than in the retracted position; and a release linkage coupled to the lower handle and having a retainer arranged for engagement with the one or more receivers of the spine to retain the spine in one of the plurality of spine positions relative to the guide, and the release linkage including a release interface arranged for user engagement and operably attached to the retainer to selectively move the retainer out of engagement with the receiver in response to user engagement.

2. The patient transport apparatus of claim 1, wherein the seat assembly is closer to the lower handle than the upper handle in the retracted position.

3. The patient transport apparatus of claim 1, wherein the receiver comprises one receiver selected from a notch and an aperture formed in the spine.

4. The patient transport apparatus of claim 1, wherein the retainer extends through the guide to engage the receiver.

5. The patient transport apparatus of claim 1, wherein the retainer is moveable along a retainer axis to engage the receiver.

6. The patient transport apparatus of claim 5, wherein the release interface comprises a pivot member pivotable about a pivot axis perpendicular to the retainer axis.

7. The patient transport apparatus of claim 6, wherein the release linkage comprises a cross-pin coupled to the retainer and the pivot member.

8. The patient transport apparatus of claim 7, wherein the pivot member defines a slot for receiving the cross-pin; and wherein the pivot member, the cross-pin, and the retainer define a slotted link mechanism to convert rotational movement of the pivot member into linear movement of the retainer.

9. The patient transport apparatus of claim 6, wherein the retainer comprises an elongated body.

10. The patient transport apparatus of claim 6, wherein the pivot member is positioned adjacent the grasping portion to permit a user to simultaneously engage the pivot member while grasping the grasping portion of the lower handle.

11. The patient transport apparatus of claim 6, wherein the pivot member comprises a curved body to at least partially surround the grasping portion of the lower handle.

12. The patient transport apparatus of claim 6, wherein the pivot member is disposed beneath the grasping portion of the lower handle.

13. The patient transport apparatus of claim 1, wherein the spine comprises an elongated tube extending along the telescoping axis.

14. The patient transport apparatus of claim 13, wherein the elongated tube comprises a non-circular cross-section.

15. The patient transport apparatus of claim 1, wherein the fowler frame is rotatable relative to the seat frame about a fowler axis, and wherein the grasping portion of the lower handle extends along a grasping axis parallel to the fowler axis.

16. The patient transport apparatus of claim 1, further comprising:

a front assembly coupled to the front end of the seat frame and configured for movement between a plurality of front assembly positions; and a rear assembly coupled to the rear end of the seat frame and configured for movement between a plurality of rear assembly positions.

17. The patient transport apparatus of claim 16, further comprising:

a front actuator arranged to articulate the front assembly relative to the seat frame between the front assembly positions; and a rear actuator arranged to articulate the rear assembly relative to the seat frame between the rear assembly positions.

18. The patient transport apparatus of claim 1, wherein at least part of one or more of the seat assembly, the fowler assembly, and the telescoping handle assembly defines a portion of a litter.

19. The patient transport apparatus of claim 18, further comprising:

a base having a head end and a foot end, the base including:

a base frame supporting a plurality of wheels arranged for movement about a floor surface, an intermediate frame having a trolley configured to translate between a plurality of trolley positions including a trolley forward position where the trolley is arranged at the head end of the base and a trolley docking position where the trolley is arranged at the foot end of the base, and a base lift device to move the intermediate frame relative to the base frame between a plurality of vertical configurations including a maximum raised configuration and a maximum lowered configuration, wherein the litter is configured to be docked to and undocked from the trolley of the intermediate frame such that, when docked to the trolley, the litter is configured to slidably translate relative to the intermediate frame between a plurality of litter positions to facilitate docking and undocking the litter from the trolley.

* * * * *